(12) United States Patent
Anma

(10) Patent No.: US 9,193,420 B2
(45) Date of Patent: Nov. 24, 2015

(54) JET PROPELLED WATERCRAFT

(71) Applicant: YAMAHA HATSUDOKI KABUSHIKI KAISHA, Iwata-shi, Shizuoka (JP)

(72) Inventor: Hirofumi Anma, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/475,641

(22) Filed: Sep. 3, 2014

(65) Prior Publication Data
US 2015/0094886 A1    Apr. 2, 2015

(30) Foreign Application Priority Data
Oct. 1, 2013  (JP) .................................. 2013-206316

(51) Int. Cl.
| | |
|---|---|
| *B60L 3/00* | (2006.01) |
| *B63C 9/00* | (2006.01) |
| *B63H 23/00* | (2006.01) |
| *B60K 28/04* | (2006.01) |
| *G01S 19/17* | (2010.01) |
| *G01S 19/19* | (2010.01) |

(52) U.S. Cl.
CPC ............... *B63C 9/0005* (2013.01); *B60K 28/04* (2013.01); *B63H 23/00* (2013.01); *G01S 19/17* (2013.01); *G01S 19/19* (2013.01); *B63C 2009/0017* (2013.01)

(58) Field of Classification Search
None
See application file for complete search history.

(56) References Cited

U.S. PATENT DOCUMENTS

| | | | |
|---|---|---|---|
| 2004/0048598 A1* | 3/2004 | Gagnon | ...................... 455/404.2 |
| 2004/0180585 A1* | 9/2004 | Kinoshita | .......................... 440/1 |
| 2005/0192735 A1* | 9/2005 | Ito et al. | ........................ 701/115 |

FOREIGN PATENT DOCUMENTS

JP    2002-120794 A    4/2002

* cited by examiner

*Primary Examiner* — Thomas Tarcza
*Assistant Examiner* — Garrett Evans
(74) *Attorney, Agent, or Firm* — Keating & Bennett, LLP

(57) ABSTRACT

A jet propelled watercraft includes a vessel body, a jet propulsion mechanism, an engine, at least one switch, and an emergency contact unit. The at least one switch includes an engine stop switch, a lanyard switch, and a rollover switch. The engine stop switch is configured to stop the engine in response to manual operation. The lanyard switch is configured to stop the engine in response to detachment of a lanyard. The rollover switch is configured to stop the engine in response to rollover of the vessel body. The emergency contact unit includes a determination portion and an instruction portion. The determination portion determines whether or not rescue is required based on the status of the at least one switch when the engine has been stopped. The instruction portion instructs transmission of a distress signal to a predetermined emergency contact when the determination portion has determined that rescue is required.

8 Claims, 4 Drawing Sheets

JET PROPELLED WATERCRAFT

CROSS-REFERENCE TO RELATED APPLICATIONS

This application claims priority under 35 U.S.C. §119 to Japanese Patent Application No. 2013-206316, filed on Oct. 1, 2013. The entire disclosure of Japanese Patent Application No. 2013-206316 is hereby incorporated herein by reference.

BACKGROUND OF THE INVENTION

1. Field of the Invention

The present invention relates to a jet propelled watercraft.

2. Description of the Related Art

A method has been disclosed that causes a fishing vessel to stop the engine thereof and causes a mobile phone to transmit a distress signal asking for rescue to a specific location when a special positional sensor worn by a crew of the fishing vessel detects an abnormal position of the crew (see Japan Laid-open Patent Application Publication No. JP-A-2002-120794).

There is a chance that an operator of a jet propelled watercraft falls into the water due to erroneous operation. It is unnecessary to ask for rescue as long as the operator can swim and return to the jet propelled watercraft. However, supposing that the method described in JP-A-2002-120794 is applied to a jet propelled watercraft, the abnormal position of the operator is detected when the operator falls into the water. Thus, the distress signal is inevitably and erroneously transmitted even when rescue is not required for the operator. Therefore, there is a demand to provide a method of enabling determination of the necessity for rescue regardless of the position of the operator.

SUMMARY OF THE INVENTION

Preferred embodiments of the present invention have been conceived in view of the above described situation, and provide a jet propelled watercraft that inhibits erroneous transmission of a distress signal.

A jet propelled watercraft includes a vessel body, a jet propulsion mechanism, an engine, at least one switch, and an emergency contact unit. The jet propulsion mechanism is configured to propel the vessel body. The engine is configured to drive the jet propulsion mechanism. The at least one switch includes an engine stop switch, a lanyard switch, and a rollover switch, for example. The engine stop switch is configured to stop the engine in response to a manual operation. A lanyard which is coupled to a vessel operator is detachably attached to the lanyard switch. The lanyard switch is configured to stop the engine in response to detachment of the lanyard. The rollover switch is configured to stop the engine in response to rollover of the vessel body. The emergency contact unit includes a determination portion and an instruction portion. The determination portion is programmed and configured to determine whether or not rescue is required based on an actuation status of the at least one switch when the engine has been stopped. The instruction portion is programmed and configured to instruct transmission of a distress signal to a predetermined emergency contact information when the determination portion has determined that rescue is required.

According to the preferred embodiments of the present invention disclosed herein, it is possible to provide a jet propelled watercraft that inhibits erroneous transmission of a distress signal.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
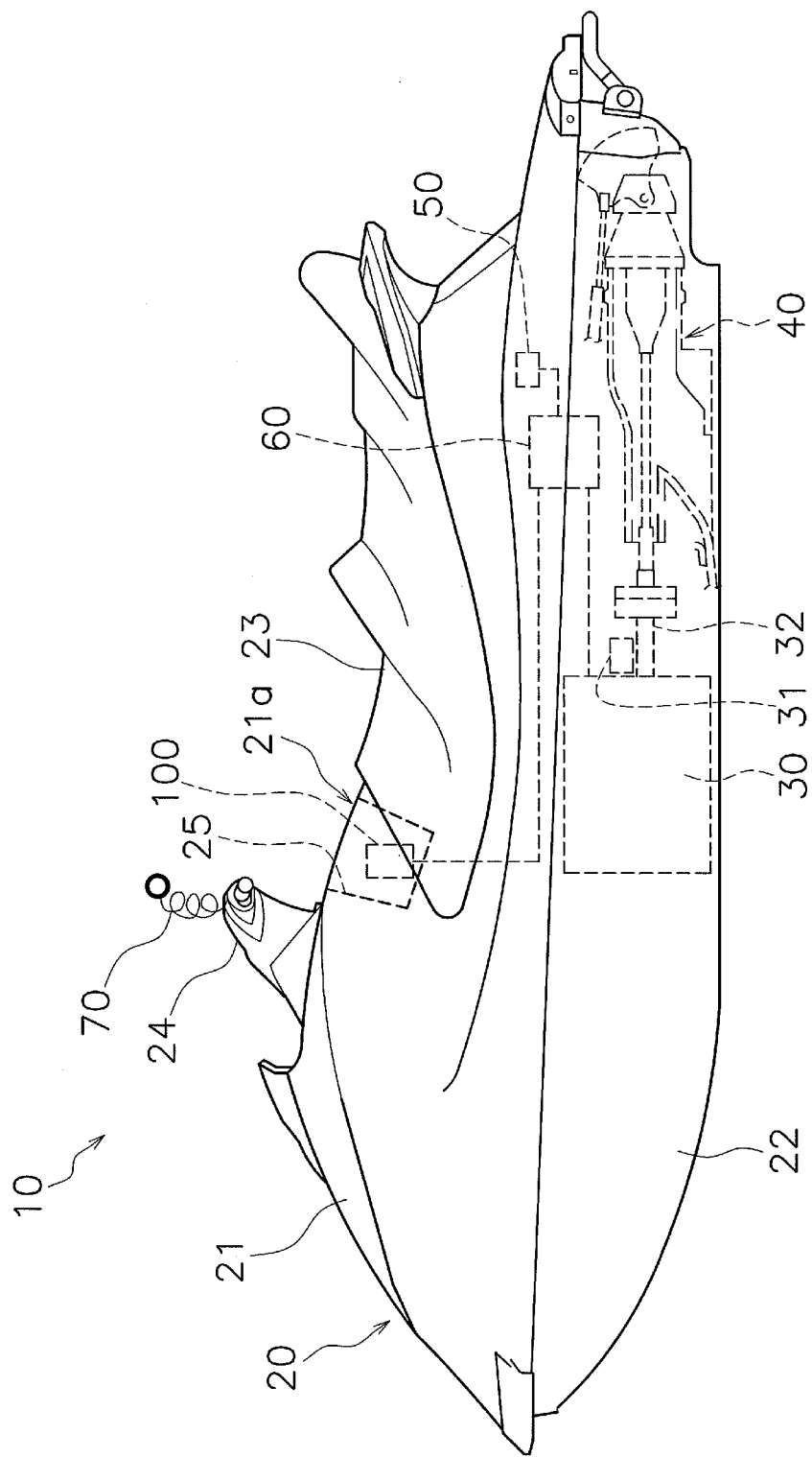
FIG. 1 is a side view of a jet propelled watercraft according to a preferred embodiment of the present invention.
Figure 2:
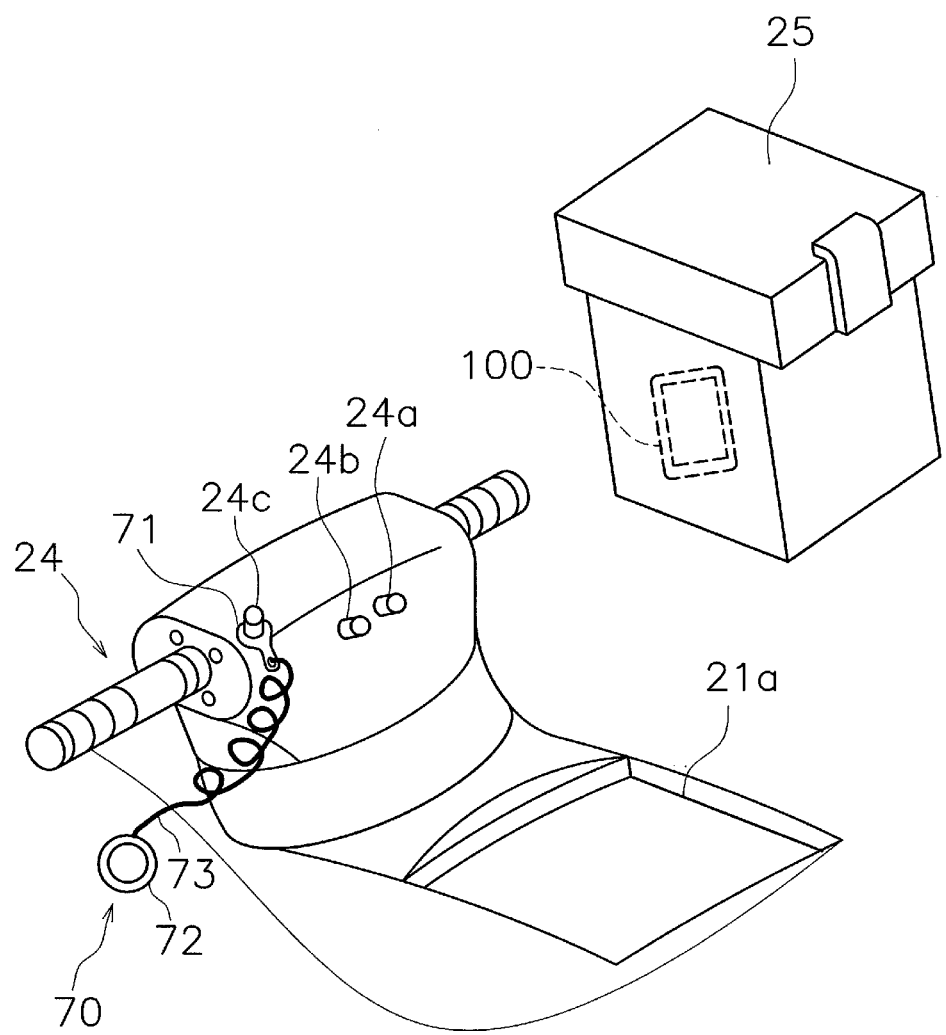
FIG. 2 is an upper perspective view of a portion of a deck according to a preferred embodiment of the present invention.
Figure 3:
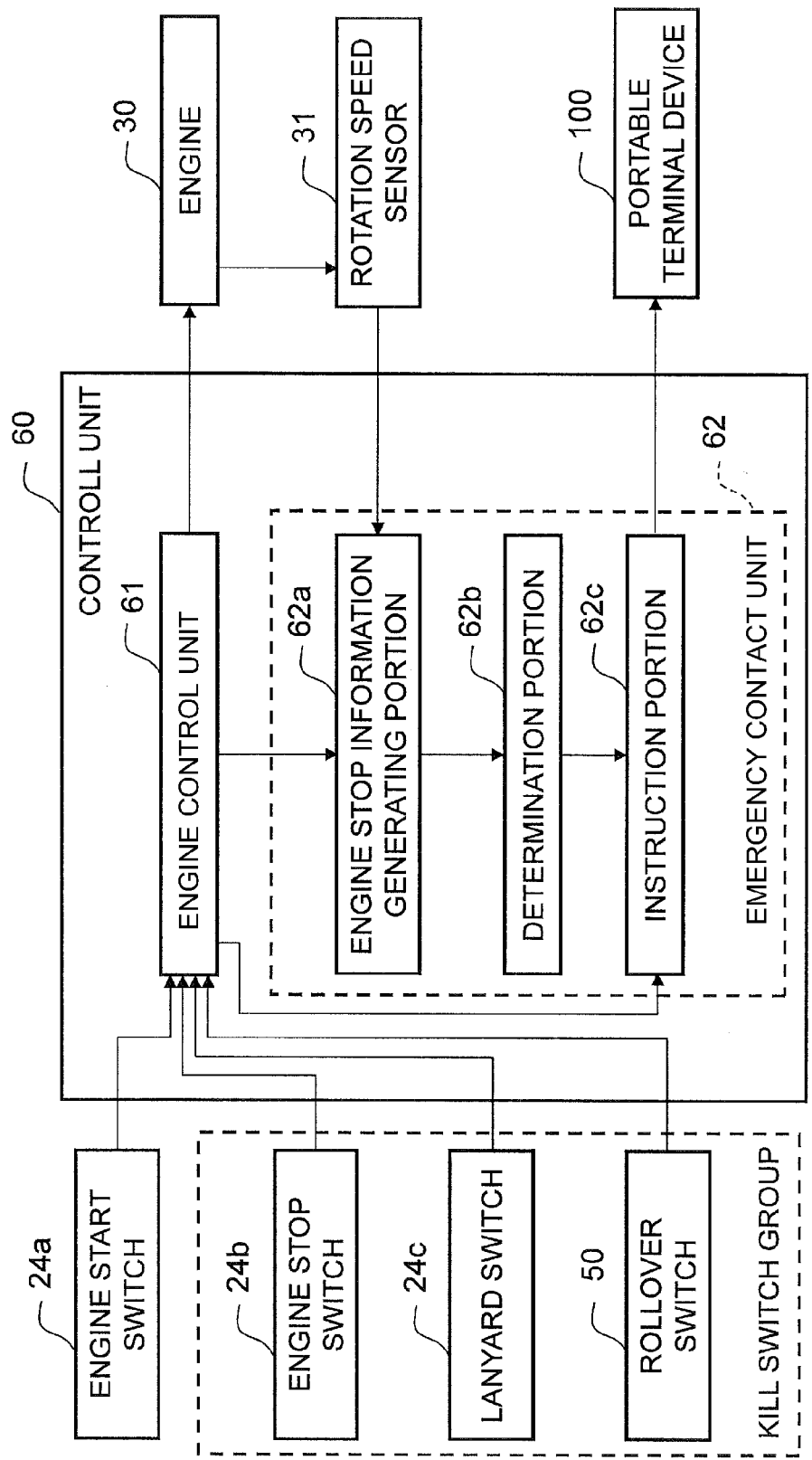
FIG. 3 is a block diagram representing a configuration of a control unit according to a preferred embodiment of the present invention.

With reference to the drawings, explanation will be hereinafter made of a jet propelled watercraft according to a preferred embodiment of the present invention. FIG. 1 is a side view of a jet propelled watercraft 10. FIG. 2 is an upper perspective view of a portion of a deck 21. FIG. 3 is a block diagram representing a configuration of a control unit 60.

The jet propelled watercraft 10 is a so-called a personal watercraft (PWC). The jet propelled watercraft 10 includes a vessel body 20, an engine 30, a jet propulsion mechanism 40, a rollover switch 50, and the control unit 60.

As illustrated in FIG. 1, the vessel body 20 includes the deck 21 and a hull 22. A seat 23 of a saddle riding type is attached to the deck 21. The seat 23 is disposed above the engine 30. A steering handle 24 to steer the vessel body 20 is disposed on the deck 21. The steering handle 24 is disposed forward of the seat 23. The deck 21 includes an opening 21a between the seat 23 and the steering handle 24. A waterproof case 25 is attached to the opening 21a. The waterproof case 25 accommodates a portable terminal device 100. The portable terminal device 100 may be a possession of a vessel operator, or alternatively, may be always kept in the jet propelled watercraft 10. In the present exemplary preferred embodiment, the portable terminal device 100 is designed to be connected to the control unit 60 by a wired communication. However, the portable terminal device 100 may be designed to be connected to the control unit 60 by a wireless communication. At least an e-mail address and/or a phone number of a predetermined emergency contact information (a dealer, a management office of a marina, etc.) preferably have/has been preliminarily registered in the portable terminal device 100. A multifunctional portable terminal device (e.g., a so-called a smart phone), in which a variety of applications such as a GPS function are available, is preferably suitable as the portable terminal device 100.

As illustrated in FIG. 2, an engine start switch 24a, an engine stop switch 24b, and a lanyard switch 24c are mounted to the steering handle 24. The engine start switch 24a is a member to start the engine 30 by manual operation. The engine stop switch 24b is a member to stop the engine 30 by manual operation. The lanyard switch 24c is a member to stop the engine 30 in response to detachment of a lanyard 70. The lanyard 70 includes a terminal portion 71, an attachment portion 72, and a cord 73. The terminal portion 71 is detachably attached to the lanyard switch 24c so as to be hooked thereon and to come off therefrom. The attachment portion 72 is attached to the arm or so forth of the vessel operator. The cord 73 couples the terminal portion 71 and the attachment portion 72. When the vessel operator falls into the water, the terminal portion 71 is detached from the lanyard switch 24c and the lanyard switch 24c is actuated.

The engine 30 is disposed in the inside of the vessel body 20. The engine 30 includes a rotation speed sensor 31 and a crankshaft 32. The rotation speed sensor 31 is configured to detect the rotation speed of the engine 30. The crankshaft 32 is coupled to the jet propulsion mechanism 40, and extends from the engine 30 rearward. The jet propulsion mechanism 40 is configured to be driven by the engine 30. The jet propulsion mechanism 40 is configured to suck in and eject water that surrounds the vessel body 20 in order to propel the vessel body 20.

The rollover switch 50 is disposed in the inside of the vessel body 20. The rollover switch 50 is configured to detect that the vessel body 20 has rolled over (or is laying sideways). An acceleration sensor, a vibration sensor or so forth is preferably used as the rollover switch 50.

The control unit 60 is disposed in the inside of the vessel body 20. As shown in FIG. 3, the control unit 60 includes an engine control unit 61 and an emergency contact unit 62. The emergency contact unit 62 includes an engine stop information generating portion 62a, a determination portion 62b, and an instruction portion 62c.

The engine control unit 61 is connected to the engine start switch 24a, the engine stop switch 24b, the lanyard switch 24c, and the rollover switch 50. In the following explanation, the engine stop switch 24b, the lanyard switch 24c, and the rollover switch 50 will be collectively referred to as "a kill switch group" on an as-needed basis. The engine control unit 61 is programmed and configured to start the engine 30 when the engine start switch 24a is pressed down. The engine control unit 61 is programmed and configured to control the rotation speed of the engine 30 in response to a throttle operation by the vessel operator after starting the engine 30.

The engine control unit 61 is programmed and configured to stop the engine 30 when at least one switch defining the kill switch group is actuated. The engine control unit 61 is programmed and configured to output "kill switch information" to the engine stop information generating portion 62a. The kill switch information indicates which one of the switches of the kill switch group has been actuated and caused the engine 30 to be stopped.

The engine control unit 61 is programmed and configured to restart the engine 30 when the engine start switch 24a is pressed down after the engine 30 has been stopped in response to actuation of the kill switch group. At this time, the engine control unit 61 is programmed and configured to output "restart information" to the instruction portion 62c. The restart information indicates that the engine 30 has been restarted.

The engine stop information generating portion 62a is programmed and configured to determine that the engine 30 has been stopped when the output of the rotation speed sensor 31 becomes "0". The engine stop information generating portion 62a is programmed and configured to generate "engine stop information" when it is determined that the engine 30 has been stopped. The engine stop information indicates a cause of why the engine 30 has been stopped. Specifically, when having already obtained the kill switch information, the engine stop information generating portion 62a is programmed and configured to write in the engine stop information the content of which one of the switches of the kill switch group has caused the engine 30 to be stopped. By contrast, when having not yet obtained the kill switch information, the engine stop information generating portion 62a is programmed and configured to write in the engine stop information the content that the engine 30 has been stopped but not due to actuation of the kill switch group. In other words, the engine stop information indicates whether or not the engine 30 has been stopped due to actuation of the kill switch group and which one of the switches of the kill switch group has caused the engine 30 to be stopped. The engine stop information generating portion 62a is programmed and configured to output the engine stop information to the determination portion 62b.

When obtaining the engine stop information from the engine stop information generating portion 62a, the determination portion 62b is programmed and configured to determine whether or not rescue is required for the vessel operator based on the content of the obtained engine stop information. Specifically, when the engine 30 has been stopped due to either actuation of the lanyard switch 24c or that of the rollover switch 50, the determination portion 62b is programmed and configured to determine that rescue is required for the vessel operator. On the other hand, when the engine 30 has been stopped due to actuation of the engine stop switch 24b, the determination portion 62b is programmed and configured to determine that rescue is not required for the vessel operator. Yet, on the other hand, when the engine 30 has been stopped without actuation of the kill switch group, the determination portion 62b is programmed and configured to determine that equipment failure has occurred and rescue is not required for the vessel operator. When it is determined that rescue is required for the vessel operator, the determination portion 62b is programmed and configured to inform the instruction portion 62c of the determined content.

The instruction portion 62c is connected to the portable terminal device 100, and thus communicates with the portable terminal device 100. When being informed of the content that rescue is required for the vessel operator, the instruction portion 62c is programmed and configured to stand by until elapse of a predetermined period of time (e.g., about 300 seconds). When having obtained the restart information from the engine control unit 61 until elapse of the predetermined period of time, the instruction portion 62c is programmed and configured to finish the process. By contrast, when having not obtained the restart information until elapse of the predetermined period of time, the instruction portion 62c is programmed and configured to instruct the portable terminal device 100 to transmit a distress signal.

After instructing the portable terminal device 100 to transmit the distress signal, the instruction portion 62c is programmed and configured to instruct the portable terminal device 100 to retransmit the distress signal at every elapse of a predetermined period of time (e.g., about 300 seconds). When having obtained the restart information from the engine control unit 61, the instruction portion 62c is programmed and configured to instruct the portable terminal device 100 to finish transmitting the distress signal.

When having been instructed by the instruction portion 62c to transmit (or retransmit) the distress signal, the portable terminal device 100 is programmed and configured to transmit the distress signal to a preliminarily registered emergency contact information. The distress signal preferably includes "positional information" that indicates the position of the vessel body 20. A position, based on a GPS signal received by the portable terminal device 100, is preferably used as the positional information. The distress signal may be transmitted in the form of a voice call, for example. However, when including the positional information, the distress signal is preferably transmitted in the form of e-mail, for example.

When having been instructed by the instruction portion 62c to finish transmitting the distress signal, the portable terminal device 100 is programmed and configured to transmit an all-clear signal to the preliminarily registered emergency contact information. The all-clear signal is only required to indicate the content that the vessel operator is capable of operating the jet propelled watercraft for himself/herself.

Figure 4:
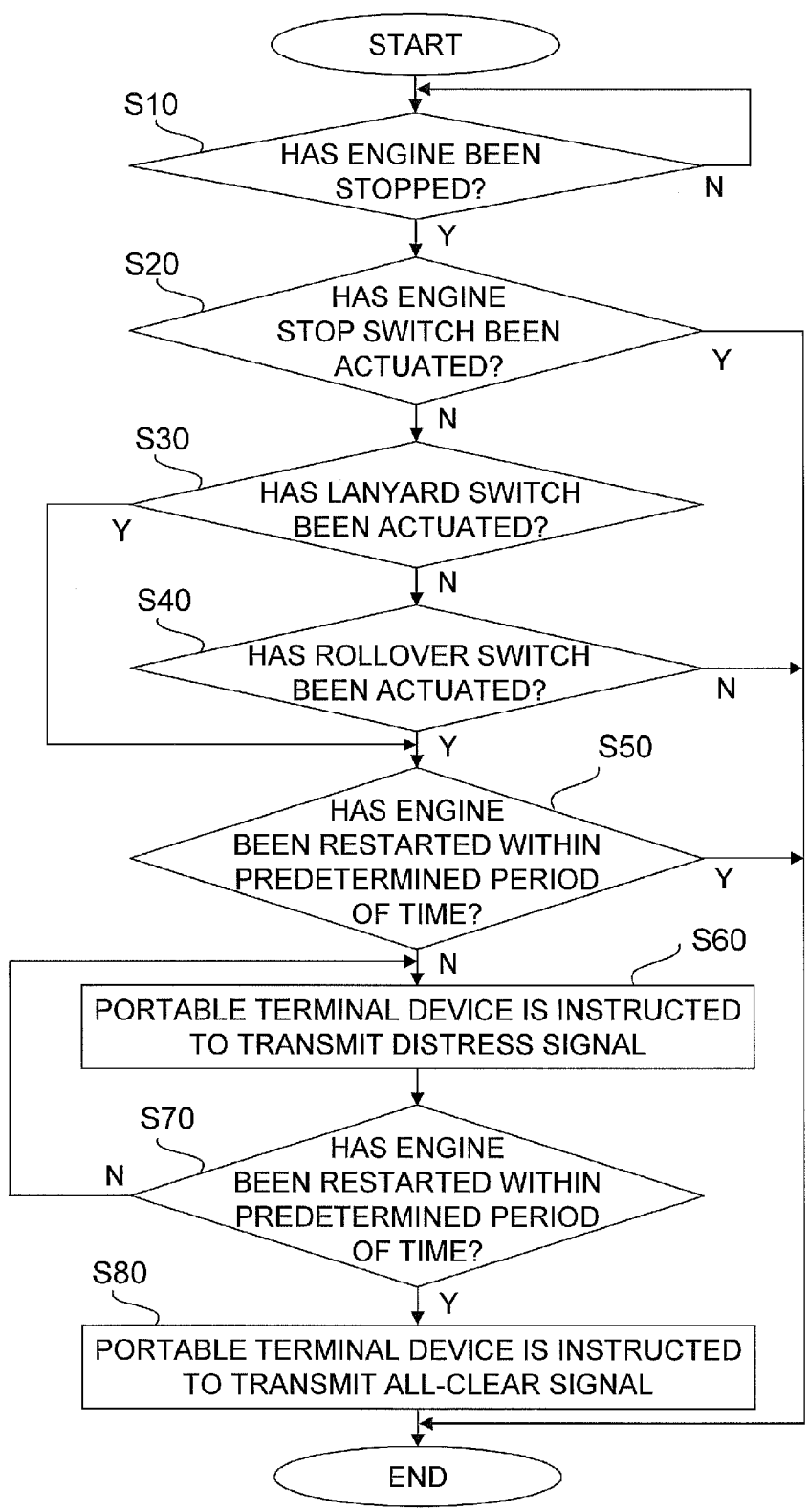
FIG. 4 is a flowchart for explaining a process of transmitting a distress signal according to a preferred embodiment of the present invention.

Explanation will be hereinafter made of a process of transmitting the distress signal to be performed by the control unit 60. FIG. 4 is a flowchart for explaining the process of transmitting the distress signal.

In Step S10, the control unit 60 determines whether or not the engine 30 has been stopped through monitoring of the output of the rotation speed sensor 31. The process proceeds to Step S20 when the engine 30 has been stopped. By contrast, the process repeats Step S10 when the engine 30 has not been stopped.

In Step S20, the control unit 60 determines whether or not the engine 30 has been stopped due to actuation of the engine stop switch 24b. The control unit 60 determines that the engine 30 has been stopped by a normal operation and the process ends when it is determined that the engine 30 has been stopped due to actuation of the engine stop switch 24b. By contrast, the process proceeds to Step S30 when the control unit 60 determines that the engine 30 has been stopped but not due to actuation of the engine stop switch 24b.

In Step S30, the control unit 60 determines whether or not the engine 30 has been stopped due to actuation of the lanyard switch 24c. The process proceeds to Step S50 when the control unit 60 determines that the engine 30 has been stopped due to actuation of the lanyard switch 24c. By contrast, the process proceeds to Step S40 when the control unit 60 determines that the engine 30 has been stopped but not due to actuation of the lanyard switch 24c.

In Step S40, the control unit 60 determines whether or not the engine 30 has been stopped due to actuation of the rollover switch 50. The process proceeds to Step S50 when the control unit 60 determines that the engine 30 has been stopped due to actuation of the rollover switch 50. By contrast, he control unit 60 determines that the engine 30 has been stopped due to equipment failure when it is determined that the engine 30 has been stopped but not due to actuation of the rollover switch 50. Then, the process ends.

In Step S50, the control unit 60 determines whether or not the engine 30 has been restarted until elapse of a predetermined period of time after stopping of the engine 30. The control unit 60 determines that the vessel operator is capable of operating the jet propelled watercraft for himself/herself when it is determined that the engine 30 has been restarted within the predetermined period of time. Then, the process ends. By contrast, the control unit 60 determines that the vessel operator is incapable of operating the jet propelled watercraft for himself/herself when the predetermined period of time has elapsed without restarting of the engine 30. Then, the process proceeds to Step S60.

In Step S60, the control unit 60 instructs the portable terminal device 100 to transmit the distress signal.

In Step S70, the control unit 60 determines whether or not the engine 30 has been restarted until elapse of a predetermined period of time after issuance of the instruction of transmitting the distress signal. The control unit 60 determines that the vessel operator is capable of operating the jet propelled watercraft for himself/herself when it is determined that the engine 30 has been restarted within the predetermined period of time. Then, the process proceeds to Step S80. By contrast, the control unit 60 determines that the vessel operator is incapable of operating the jet propelled watercraft for himself/herself when the predetermined period of time has elapsed without restarting of the engine 30. The process herein returns to Step S60 and the distress signal is retransmitted.

In Step S80, the control unit 60 instructs the portable terminal device 100 to transmit the all-clear signal.

As explained above, the emergency contact unit 62 of the control unit 60 includes the determination portion 62b and the instruction portion 62c. The determination portion 62b is programmed and configured to determine whether or not rescue is required based on the actuation status of the kill switch group. The instruction portion 62c is programmed and configured to instruct the portable terminal device 100 to transmit the distress signal when the determination portion 62b has determined that rescue is required. Thus, the distress signal is not transmitted in some situations such as when the vessel operator only slightly loses his/her posture. Therefore, it is possible to more accurately determine whether or not rescue is required in comparison with, for instance, the configuration of determining whether or not rescue is required based on the posture of the vessel operator. As a result, erroneous transmission of the distress signal is inhibited.

The kill switch group preferably includes the engine stop switch 24b, the lanyard switch 24c, and the rollover switch 50, for example. The determination portion 62b is programmed and configured to determine that rescue is required when the engine 30 has been stopped due to either actuation of the lanyard switch 24c or that of the rollover switch 50. Therefore, it is possible to more easily and conveniently determine whether or not rescue is required in comparison with, for instance, the configuration of determining whether or not rescue is required based on the posture of the vessel operator.

The instruction portion 62c is programmed and configured to instruct transmission of the distress signal after the predetermined period of time has elapsed since stopping of the engine 30. Therefore, it is possible to accurately determine whether or not the vessel operator is capable of operating the jet propelled watercraft for himself/herself in some situations such as when the vessel operator falls into the water.

Exemplary preferred embodiments of the present invention have been described above. However, the present invention is not limited to the aforementioned exemplary preferred embodiments, and a variety of changes can be herein made without departing from the scope of the present invention.

For example, the distress signal preferably is designed to include the positional information. However, the distress signal may not include the positional information.

The positional information, included in the distress signal, is preferably determined based on a GPS signal received by the portable terminal device 100. Alternatively, the positional information may be determined based on a GPS signal received by a GPS receiver attached to the vessel body 20.

The instruction portion 62c is preferably programmed and configured to stand by until elapse of the predetermined period of time when being informed of the necessity of rescue. Alternatively, the instruction portion 62c may be programmed and configured to instruct the portable terminal device 100 to transmit the distress signal simultaneously when being informed of the necessity of rescue.

The instruction portion 62c is preferably programmed and configured to instruct retransmission of the distress signal at every elapse of the predetermined period of time after issuance of an instruction to transmit the distress signal. However, the instruction portion 62c may not be programmed and configured to instruct retransmission of the distress signal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A jet propelled watercraft comprising:
a vessel body;
a jet propulsion mechanism configured to propel the vessel body;
an engine configured to drive the jet propulsion mechanism;
at least three switches including an engine stop switch, a lanyard switch, and a rollover switch, the engine stop switch being configured to stop the engine in response to manual operation, the lanyard switch being configured to stop the engine in response to detachment of a lanyard coupled to a vessel operator, the rollover switch being configured to stop the engine in response to rollover of the vessel body; and
an emergency contact unit programmed and configured to define a determination portion and an instruction portion, the determination portion being programmed and configured to determine whether or not rescue is required based on an actuation status of the at least three switches when the engine has been stopped, the instruction portion being programmed and configured to instruct transmission of a distress signal to a predetermined emergency contact when the determination portion has determined that rescue is required; wherein
the determination portion is programmed and configured to determine that rescue is not required when the engine has been stopped without actuation of any of the engine stop switch, the lanyard switch, and the rollover switch.

2. The jet propelled watercraft according to claim 1, wherein the determination portion is programmed and configured to determine whether or not rescue is required based on engine stop information indicating a cause of why the engine has been stopped.

3. The jet propelled watercraft according to claim 2, wherein the engine stop information indicates whether or not the engine has been stopped by the at least three switches and which one of the at least three switches has stopped the engine.

4. The jet propelled watercraft according to claim 1, wherein the determination portion is programmed and configured to determine that rescue is required when the engine has been stopped by either the lanyard switch or the rollover switch.

5. The jet propelled watercraft according to claim 4, wherein the instruction portion is programmed and configured to instruct transmission of the distress signal when a predetermined period of time has elapsed since stopping of the engine.

6. The jet propelled watercraft according to claim 1, wherein the distress signal includes positional information indicating a position of the vessel body.

7. The jet propelled watercraft according to claim 6, wherein the positional information indicates a position of a mobile phone programmed and configured to transmit the distress signal, the position of the mobile phone being determined based on a GPS signal received by the mobile phone.

8. The jet propelled watercraft according to claim 6, further comprising:
a receiver mounted to the vessel body, the receiver being programmed and configured to receive a GPS signal; wherein
the positional information indicates a position of the receiver based on the GPS signal received by the receiver.

* * * * *